United States Patent
Weinstein

[11] 3,932,032
[45] Jan. 13, 1976

[54] MOTION PICTURE SOUND SYNCHRONIZATION

[76] Inventor: Stephen B. Weinstein, 20 Algonquin Road, Holmdel, N.J. 07733

[22] Filed: Apr. 3, 1974

[21] Appl. No.: 457,625

[52] U.S. Cl. .................. 352/11; 352/26; 352/27
[51] Int. Cl.² ........................................ G03B 31/02
[58] Field of Search ............ 360/32; 352/11, 26, 27, 352/37

[56] References Cited
UNITED STATES PATENTS

| 3,479,648 | 11/1969 | Sleven et al. | 360/32 |
| 3,508,817 | 4/1970 | Hnilicka, Jr. | 352/27 |
| 3,510,209 | 5/1970 | Hnilicka, Jr. | 352/27 |

*Primary Examiner*—L. T. Hiz
*Assistant Examiner*—Russell E. Adams, Jr.

[57] ABSTRACT

A system is described for digital, as opposed to the usual analog, recording of a sound track in synchronism with a visual image on a motion picture film and automatically reproducing the sound in synchronism with the visual image. In one embodiment of the invention, a camera employs a linear array of light-emitting diodes across the sound track to enter a digital representation of the sound on the same frame as the synchronous visual image. The digital, specifically binary, signals which excite the light-emitting diodes are produced by analog to digital conversion of samples of the sound waveform. The binary representations are entered into shift registers at a uniform rate, and read out to the light-emitting diodes in a burst during the film advance interval immediately following shutter closure, thereby entering on the film track an optical record of all the binary pulses derived from sound produced during the just concluded frame interval. A projector capable of presenting the film sound and visual image in synchronism employs a strip of photodetectors to detect the binary pulses and a digital to analog converter to recover the original sound. Other embodiments of the invention utilize a fiber optics array, an image tube with fiber optic faceplate, or a laser scanner to enter the binary pulses on the optical sound track.

12 Claims, 8 Drawing Figures

MOTION PICTURE SOUND SYNCHRONIZATION

This invention embodies a technique for recording digital representations of sound signals on a film in synchronism with and physically adjacent to the visual exposure of the film and for projection of the images on the film in synchronism with the reproduced sound.

The motion picture industry has for years relied on the socalled "double system" of sound recording in order to maintain synchronization between the sound and the visual images while allowing a maximum of flexibility in cutting and editing. In this system, two films with frame by frame correspondence are produced, the first containing visual images and the second a magnetic or optical sound recording. Because of the frame by frame correspondence, unlimited double editing can be carried out without confusion or loss of synchronization. It is, however, inconvenient and expensive to edit in this manner, and a transcription is usually required from an original magnetic tape recording to the sprocketed sound film used for editing.

Another technique for analog sound recording, favored by television news departments and smaller industrial users, is the so-called "single system" in which the sound is recorded directly on the film track reserved for this purpose. However, analog sound recording requires smooth and continuous film motion, so that the discontinuous motion of the film behind the lens forces location of the recording head (either magnetic or optical) some distance away from the frame receiving the visual image. This spacing has become an industry standard. The projector must maintain the same separation between projection gate and sound reading head in order to realize a synchronous presentation. The main disadvantage of this system is the difficulty of editing a film in which corresponding visual and sound materials do not lie physically side by side. In addition, the sound quality of camera-contained recording systems is often not high.

It is, therefore, the primary object of the present invention to provide a sound motion picture camera in which the sound can be completely synchronized with the visual image to which it is related.

It is another object of the present invention to provide a projector of the type stated which is capable of reproduction of the visual and sound records in substantially perfect synchronization.

It is another object of the present invention to provide a camera of the type stated in which a digital representation of the sound can be optically recorded on a sound track adjacent to the corresponding visual image, thereby facilitating film editing.

It is still another object of the present invention to provide a high quality optical sound track which suffers minimal deterioration from photographic printing and which produces no sound discontinuities from splice joints.

With these and other objects in mind, the present invention resides in the novel technique and in the features of design, construction and arrangement of parts to be described and noted in the Claims.

In the accompanying drawings (five sheets).

GENERAL DESCRIPTION

The present invention relates to a motion picture camera which optically records a digital representation of a sound input in physical proximity to the corresponding visual image, and to the projector used for synchronous reproduction of images and sounds. The same strip on the motion picture film currently used for optical recording of an analog sound signal is used in the present invention for registration of dots of light corresponding to a digital (usually, but not necessarily, binary) sound signal. The digital sound signal is, in one embodiment, an example of pulse code modulation (PCM), and is produced, in accordance with well-known principles, by sampling an original analog sound waveform at a rate at least twice the highest frequency component present in the analog waveform and converting the samples in an analog to digital converter (A/D converter) to digital sequences or "words" of sufficient length to produce the desired quality of representation. The projector of the present invention performs exactly the reverse function, detecting the digital words, converting them in a digital to analog (D/A) converter to analog samples and passing the sample train through a simple low-pass filter to recreate the original analog sound waveform, all of this simultaneous with projection of the corresponding visual image.

More specifically, one of the embodiments of the camera employs an array of light-emitting diodes across the sound track of the photosensitive motion picture film just below the exit end of the gate where the visual images are imprinted. The film is advanced one frame at a time by a cam-operated claw entering successive sprocket holes in the film; the cam is synchronized with a sprocket wheel further along over which the film passes to a takeup reel. The light-emitting diodes are activated only during that part of the cycle when the film is actually moving in the exposure gate, and cause a number of dots of light to be entered into separate and resolvable positions in the sound track of the film. The lightemitting diodes are excited by electrical pulses stored in binary shift registers during the preceding frame interval, and which represent the sound produced during that interval. "Frame interval" is defined throughout this application as the time interval extending from the beginning of movement of a frame into the exposure gate until the beginning of movement of the following frame into the exposure gate. It should be emphasized that the digital information accumulated continuously during an entire frame interval is optically imprinted onto the sound track during only a fraction of the succeeding frame interval. A short burst of pulses immediately precedes each block of sound data in order to provide a starting signal for the detector circuits in the projector and facilitate accurate sound reproduction despite small variations in film dimensions, alignment and advance time. The digital sound track on each frame, like the visual image, is constrained to occupy less than a full frame space lengthwise with the film, so that splice joints can be made without disturbing either picture or sound. All functions are controlled by a digital clock circuit which is synchronized with the movement of the film.

The projector of the present invention is similar to the camera insofar as film movement is concerned, and employs a projection gate analogous to the exposure gate of the camera. An array of light-sensitive cells is placed one frame length (e.g. 35mm for commercial film) before the input of the projection gate, so that the digital sound record is read by this photocell array one frame interval prior to advance of the corresponding visual image into the projection gate. The time required for advancing the film, and hence for reading of the sound data, is only a fraction of a frame interval. The digital sound data is stored in a shift register, and during the frame interval beginning with the next film advance, it is converted by a D/A converter and low-pass filter into an analog waveform and applied to a loudspeaker, all simultaneous with projection of the corresponding visual image.

As another embodiment of the present invention, the linear LED array in the camera can be located away from the film and the light brought to the film by a bundle of optical fibers. As an alternative embodiment, the single-layer crosswise array of light-emitting diodes or optical fiber ends can be replaced by an electronic image tube with fiber-optic face plate covering the entire film area in which data are to be entered. The data are then entered during that part of the frame interval when the film is stationary in the exposure gate. Still another embodiment is the use of laser scanning in place of the electron-optical scanning performed in the image tube. In all of these embodiments of digital sound recording, the digital representation may be produced by a delta modulator, predictive coder, differential pulse-code modulator or other redundancy reducing processor instead of the pulse-code modulator heretofore assumed, with a consequent reduction of the amount of digital data required to be entered on each frame.

DETAILED DESCRIPTION

Figure 1:
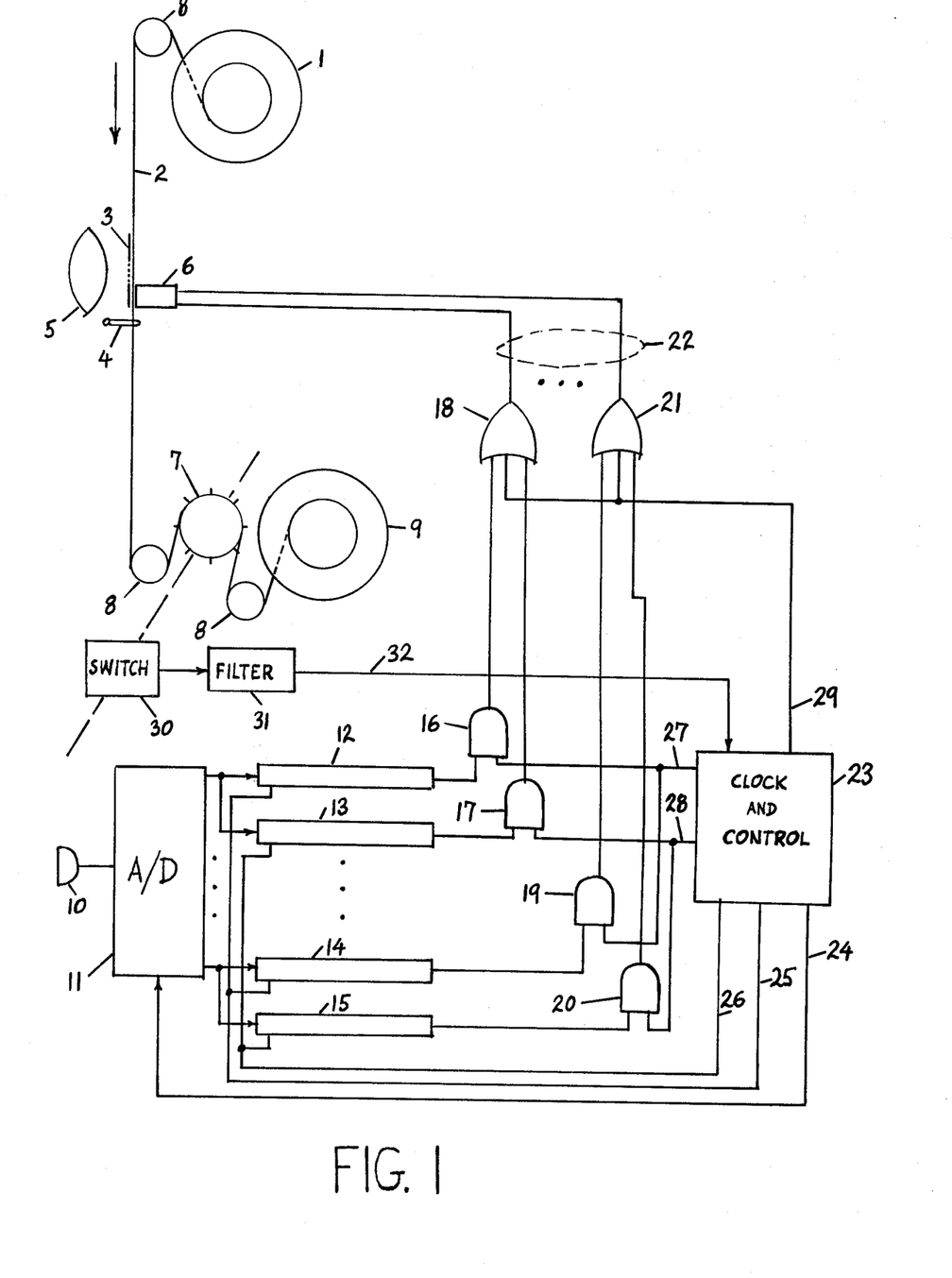
FIG. 1 is a combined electrical block diagram and schematic side elevational view of a motion picture camera constructed in accordance with and embodying the present invention.

Referring now in more detail and by reference characters to the drawings which illustrate practical embodiments of the present invention, FIG. 1 schematically illustrates a motion picture camera which produces a series of images and an optical sound track on the photosensitive film 2, which is stored in supply reel 1 and taken up in spool 9. The film 2 is more fully illustrated in FIG. 2, which indicates a strip 35 of light-sensitive emulsion available for exposure to a linear array of small discrete light-emitting diodes 6 in close proximity to the emulsion. The LED array 6, shown in an expanded illustration in FIG. 3, is excited in a manner to be presently described.

Returning to FIG. 1, the film 2 is passed behind a lens 5 and a conventional exposure gate 3, drawn by a claw 4 which is alternately inserted into and removed from sprocket holes in the film 2. The shutter mechanism in the exposure gate 3 is opened and closed once every frame interval, during that part of the frame interval when the claw 4 is not engaged in moving the film.

Figure 2:
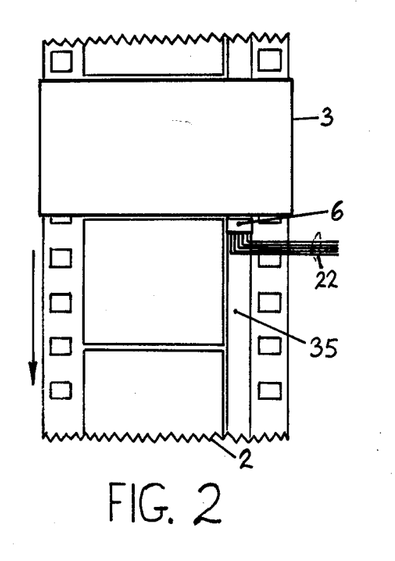
FIG. 2 is a fragmentary front elevational view of the film used in the camera of FIG. 1 and the projector of FIG. 5, and of the light-emitting diode array used to enter the digital sound information on the sound track.
Figure 3:
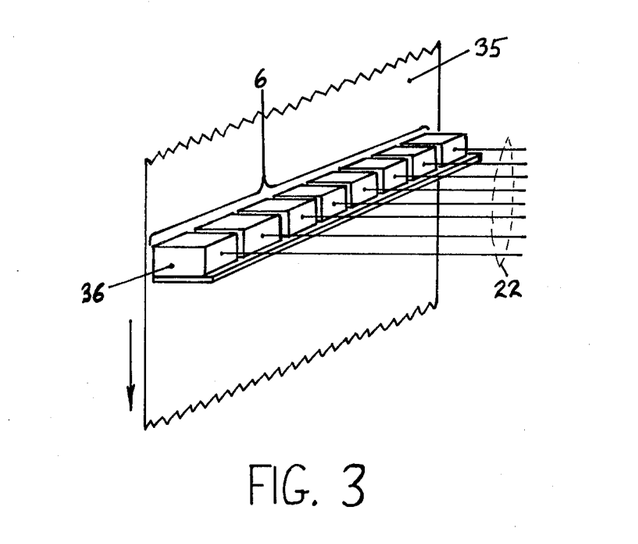
FIG. 3 is an enlarged side perspective view of the light-emitting diode array used in the camera of FIG. 1 and of a portion of the sound track of the film used in the camera of FIG. 1 and the projector of FIG. 6.

The LED array 6 introduced above is situated immediately below and to the side of the exposure gate 3 (FIG. 2). A low-friction film guide (not shown) keeps the sound track 35 of the film 2 aligned immediately under LED array 6.

After passing around the second guide roller 8 of FIG. 1, the film 2 is driven by a drive sprocket wheel 7 which, in accordance with conventional practice, engages the sprocket holes of the film 2. The sprocket wheel 7 is mechanically linked to electrical switch 30 which it opens and closes once every frame interval. This waveform is used in the clocking and control circuit to be presently described. After engagement by sprocket wheel 7, film 2 passes around the third guide roller 8 to takeup reel 9.

Aside from the LED array 6 and the switch 30, the mechanism thus far described is identical to that of a standard silent motion picture camera. We shall now describe the sound recording apparatus which is the novelty of this invention. All reference numbers appear in FIG. 1 unless otherwise stated.

An analog sound signal is detected by microphone 10, which, however, may be replaced by the output of a tape recorder or other sound source, and is applied to the A/D converter 11. Pulses are produced by clock 23 (to be presently described) at the rate required for sampling the analog sound waveform. For convenience and purposes of discussion, this rate will be taken to be 1024 pulses per frame or approximately 24575 pulses per second, presuming a frame rate of approximately 24 per second, which is sufficient for a high-quality PCM representation of frequency components up to at least 10 KHz. The sampling pulse train, illustrated in FIG. 5, appears on lead 24. Each pulse causes a sample to be taken in the A/D converter 11 and converted into a group of binary digits, the number N of which depends on the desired resolution but is expected to be from 6 to 10. This group of N binary digits constitutes a binary number, or "word", approximating the analog sample from which it has been derived. The most significant of the N digits is applied to binary shift registers 12 and 13, and the least significant of the N digits is applied to binary shift registers 14 and 15. The remaining binary digits are applied to other pairs of shift registers (not shown).

Figure 5:
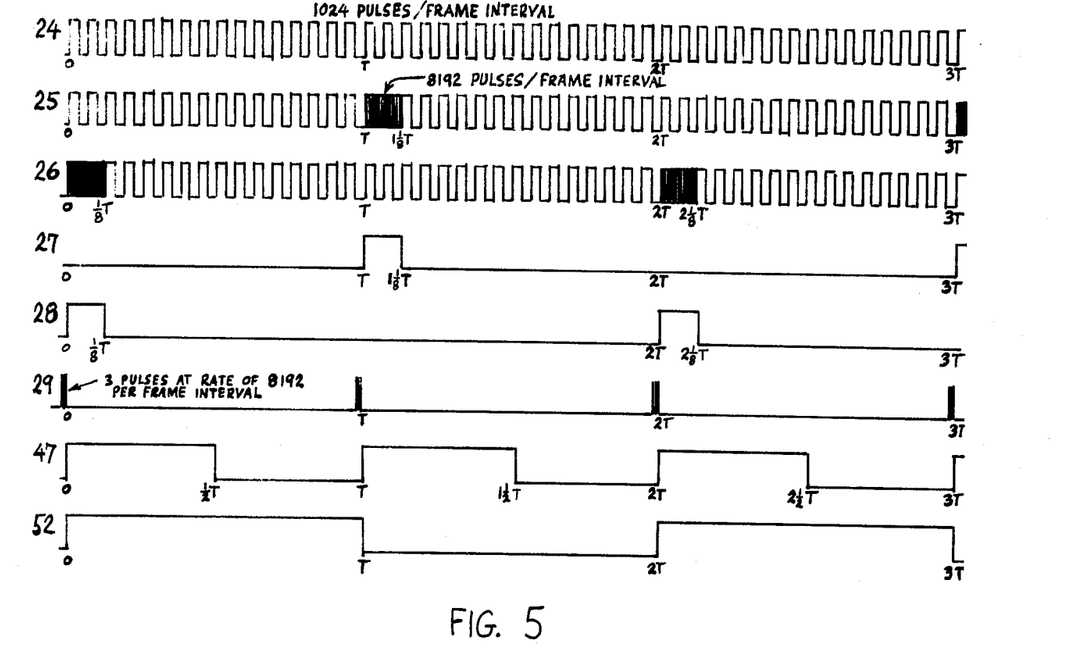
FIG. 5 is a representation of the electrical waveforms produced by the digital clocking and control circuit of FIG. 4.

The first member of each pair of shift registers, e.g. register 12 or register 14, is clocked by the waveform appearing on lead 25 and illustrated in FIG. 5, and the second member of each pair of shift registers, e.g. register 13 or register 15, by the waveform appearing on lead 26 (also illustrated in FIG. 5). It can be seen from FIG. 5 that waveform 25 alternates a frame interval of the sampling waveform on lead 24 (1024 pulses per frame interval) with a frame interval during the latter 7/8 of which this same pulse rate is maintained, and during the first 1/8 of which the pulse rate is increased by a factor of 8 so that 1024 pulses appear in this ⅛ segment of a frame interval. The purpose of the more rapid clock rate is to read out (to the light-emitting diodes) the N × 1024 bits of digital sound information produced during one frame interval in the first ⅛ of the following frame interval. Data readout begins immediately following the initiation of film motion in the exposure gate, and ends before the cessation of film movement. The implicit assumption here that the film advance time is approximately ⅛ of a frame interval is merely illustrative and not restrictive. Waveform 26 is the same as waveform 25 except that it is shifted in time by one frame interval.

The data readin-readout cycle of the shift registers is best understood by examining the sequence of events over a few frame intervals. During the time from 0 to T/8, where T is a frame interval, waveform 26 (FIG. 5) clocks out the contents of shift registers 13 and 15 (FIG. 1) which were accumulated during the full frame interval from −T to 0 seconds. Clocking waveform 28 (shown in FIG. 5) enables the output of shift register 13 to pass through AND gate 17 (FIG. 1), and the output of shift register 15 to pass through AND gate 20, and similarly for the outputs of the remaining N-2 lower shift registers (not shown) corresponding to other digits in the binary representation for a sample of the original sound waveform. The clock 23 (FIGS. 1 and 4) produces a three-pulse starting sequence on lead 29 (illustrated in FIG. 5) which immediately precedes the aforementioned activation of AND gates 17 and 20. This starting sequence, along with the outputs of AND gates 16 and 17 (which cannot both be conducting at the same time), is presented to OR gate 18. The output of OR gate 18 is passed directly, on one of the leads 22, to the LED array 6, which enters the starting sequence and the following 1024 binary digits on a narrow lengthwise segment of the sound track 35 (FIGS. 2 and 3) by means of light-emitting diode 36 in array 6 (FIG. 3). The outputs of the other (N-1) OR gates are similarly passed, via leads 22, to elements of the LED array 6. A total of N parallel digital tracks are entered on the film sound track 35, each consisting of a 3-digit starting sequence followed by 1024 data pulses.

During this same frame interval from 0 to T seconds, the alternate set of shift registers (FIG. 1), among which register 12 contains most significant and register 14 least significant digits, are being clocked by the waveform on lead 25 (FIG. 5), and are thus receiving samples from A/D converter 11 (FIG. 1) at the uniform rate of 1024 per frame interval which was presumed earlier. Because clocking waveform 27 is zero during this interval, AND gates 16 and 19 following shift registers 12 and 14 respectively have "low" outputs and do not in any way activate LED array 6.

During the following frame interval from T to 2T seconds, the functions of the first member and the second member of each pair of shift registers (FIG. 1) are interchanged. In particular, shift registers 13 and 15 are clocked by waveform 26 at the uniform sampling rate of 1024 pulses per frame interval and shift registers 12 and 14 are clocked by waveform 25 at a rate 8 times higher during the first ⅛ of the frame interval and at the 1024 per frame interval rate during the remaining 7/8 of the frame interval. During the first ⅛ of the frame interval from T to 2T, the contents of shift registers 12 and 14 are passed through AND gates 16 and 19 respectively to OR gates 18 and 21 respectively, from which they, and the starting pulses immediately preceding them, are fed through leads 22 to the LED array 6, in precise analogy to operation during the frame interval from 0 to T seconds.

Each pair of shift registers attached to one of the parallel outputs of A/D converter 11 is effectively a buffer between a uniform data source and an intermittent data user. A single 1024-bit register would not be adequate. It can, in fact, be shown that during readout of a shift register the data continuing to arrive from A/D converter 11 are each entered into eight shift register stages instead of one, so that an entirely incorrect digital sequence would be recorded on the film if that same register were again read out during the following frame interval. By giving each shift register an entire frame interval to "clear" and become filled with new digits in the proper locations, a correct sequence is always available to be applied to the LED array 6.

It remains to describe the operation of the clock and control circuit which produces the electrical waveforms appearing on leads 24, 25, 26, 27, 28 and 29 of FIG. 1. It will be noted from FIG. 1 that the frame-rate pulsed electrical waveform produced by switch 30 previously described is passed through a narrowband filter 31 which eliminates harmonic components and provides, on lead 32, a sinusoid at the frame frequency, which, for purposes of discussion, has been taken to be 24 Hz.

Figure 4:
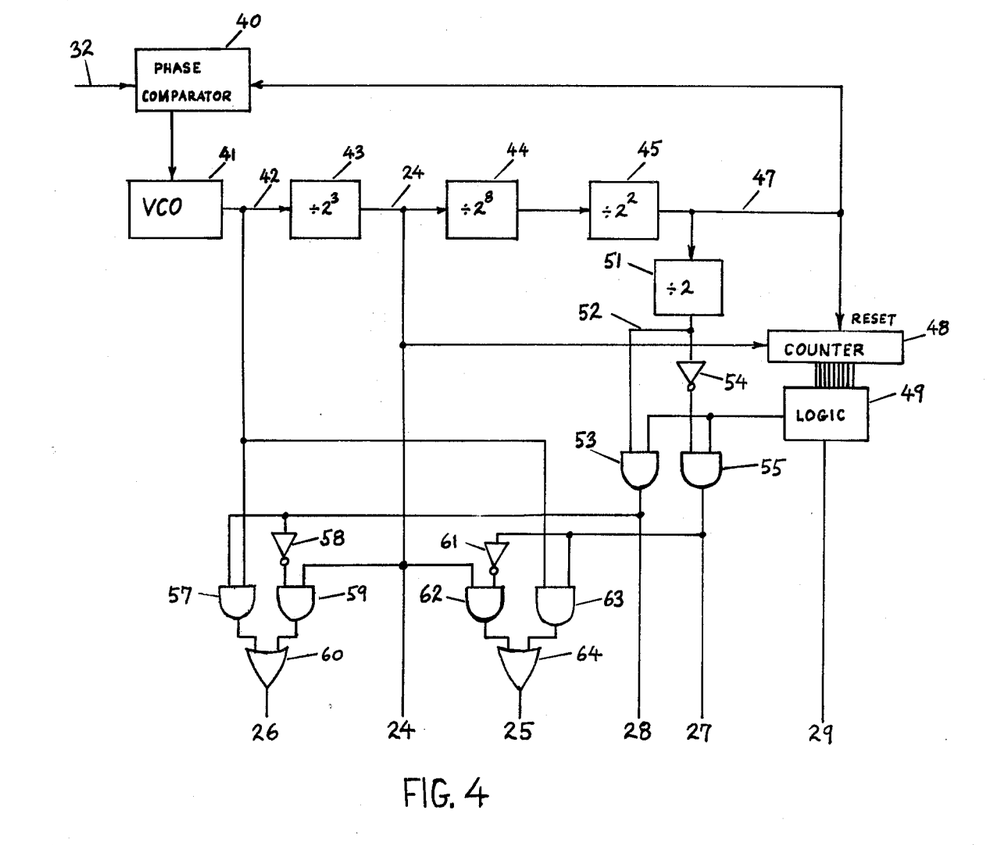
FIG. 4 is an electrical block diagram of the digital clocking and control circuit used in the camera of FIG. 1.

Referring to FIG. 4, which is an electrical block diagram of the clocking and control circuit, the frame-rate sinusoid on lead 32 is applied to a phase comparator 40 of conventional design, which is part of a first-order phase-locked loop designed to produce a square wave of frequency 8192 per frame interval (or 196.608 KHz at a frame rate of 24 per second) phase-locked with the signal on lead 32. This high rate square wave appears on lead 42. The loop consists of the phase comparator 40, a voltage-controlled squarewave oscillator 41, and a chain of conventionally designed digital frequency-division circuits 43, 44 and 45 with division factors of 8, 256 and 4 respectively. The operation of this type of loop is well known and will not be further described, except to note that the square waves appearing on leads 42, 24, 46 and 47 have frequencies of 8192, 1024, 4 and 1 per frame interval respectively, and are locked together in phase. The waveforms appearing on leads 24 and 47 are illustrated in FIG. 5.

The waveform on lead 24, which is at the basic sampling rate of 1024 per frame interval specified earlier in the discussion of FIG. 1, is one of the output waveforms of the clocking and control circuit and is so indicated at the bottom of FIG. 3. It is also applied to binary counter 48 which is reset by "up" transitions of the square wave at the rate of 1 per frame interval appearing on the previously mentioned lead 47. The counter is hence designed to reset to zero at the beginning of each frame interval and then to count the pulses appearing on lead 24 during each frame interval. With the nominal 1024 pulses per frame interval previously attributed to the waveform on lead 24, the counter 48 will count to 1024 once each frame interval. Certain individual stages of the counter are connected, by a multiplicity of leads, to a logic circuit 49 consisting of arrangements of logical gates which produce a waveform which is "high" when the counter is at counts 1022, 1023 and 1024 and "low" otherwise. This waveform, appearing on lead 29 and illustrated in FIG. 5, is therefore "high" only during the last three of the 1024 sampling intervals associated with each frame interval, and is the starting sequence appearing on lead 29 of FIG. 1. The logic circuit 49 provides another output, on lead 50, which is "high" for the first 128 counts of counter 48 and "low" otherwise. This waveform contributes, in a manner to be presently described, to production of the control signals on leads 25, 26, 27 and 28 of FIG. 1 and FIG. 4. The logic circuit 49 is designed in accordance with conventional and familiar principles and requires no further discussion.

Further describing the clocking and control circuit of FIG. 4, the square wave at the frequency of one per frame interval appearing on lead 47 is applied to a factor of two digital frequency divider 51 (of conventional design) which produces a signal on lead 52, illustrated in FIG. 5, which alternates between "high" and "low" on successive frame intervals. This waveform is applied, along with that on lead 50 (previously described), to AND gate 53. The output of AND gate 53 is the control waveform appearing on lead 28 of FIG. 1 and FIG. 4, and illustrated in FIG. 5. This waveform is "high" for the first one-eighth of alternate frame intervals, and "low" otherwise. The complement of the waveform on lead 52, produced by inverter 54, is applied, along with the signal on lead 50, to AND gate 55. The output of AND gate 55 is the control signal on lead 27 of FIGS. 1 and 4, and is illustrated in FIG. 5. It is apparent that control signals 27 and 28 are identical except for a relative shift of one frame interval T.

The control signals on leads 27 and 28, in addition to being outputs of the clocking circuit in their own right, are used in the production of the clocking waveforms on leads 25 and 26 of FIGS. 1 and 4. Specifically, the control signal on lead 27 and the 8192 pulses per frame interval square wave on lead 56 are fed to AND gate 63, which has an output which is "low" except for a burst of 1024 cycles of the 8192 cycles per frame interval square wave during the first ⅛ of alternate frame intervals. The complement of the waveform on lead 27 is produced by inverter 61 and applied, along with the 1024 cycles per frame interval square wave on lead 24, to AND gate 62, resulting in an output which is identical to the 1024 cycles per frame interval square wave on lead 24 except for the first one-eighth of alternate frame intervals, when it is "low". The application of the outputs of AND gates 62 and 63 to OR gate 64 results in the clocking waveform appearing on lead 25 of FIGS. 1 and 4 and illustrated in FIG. 5. By an entirely analogous description, it can be shown that inverter 58, AND gates 57 and 59 and OR gate 60 produce the clocking waveform appearing on lead 26 of FIGS. 1 and 4, and illustrated in FIG. 5. It will be noted that clocking waveforms 25 and 26 are identical except for a relative shift of one frame interval.

Figure 6:
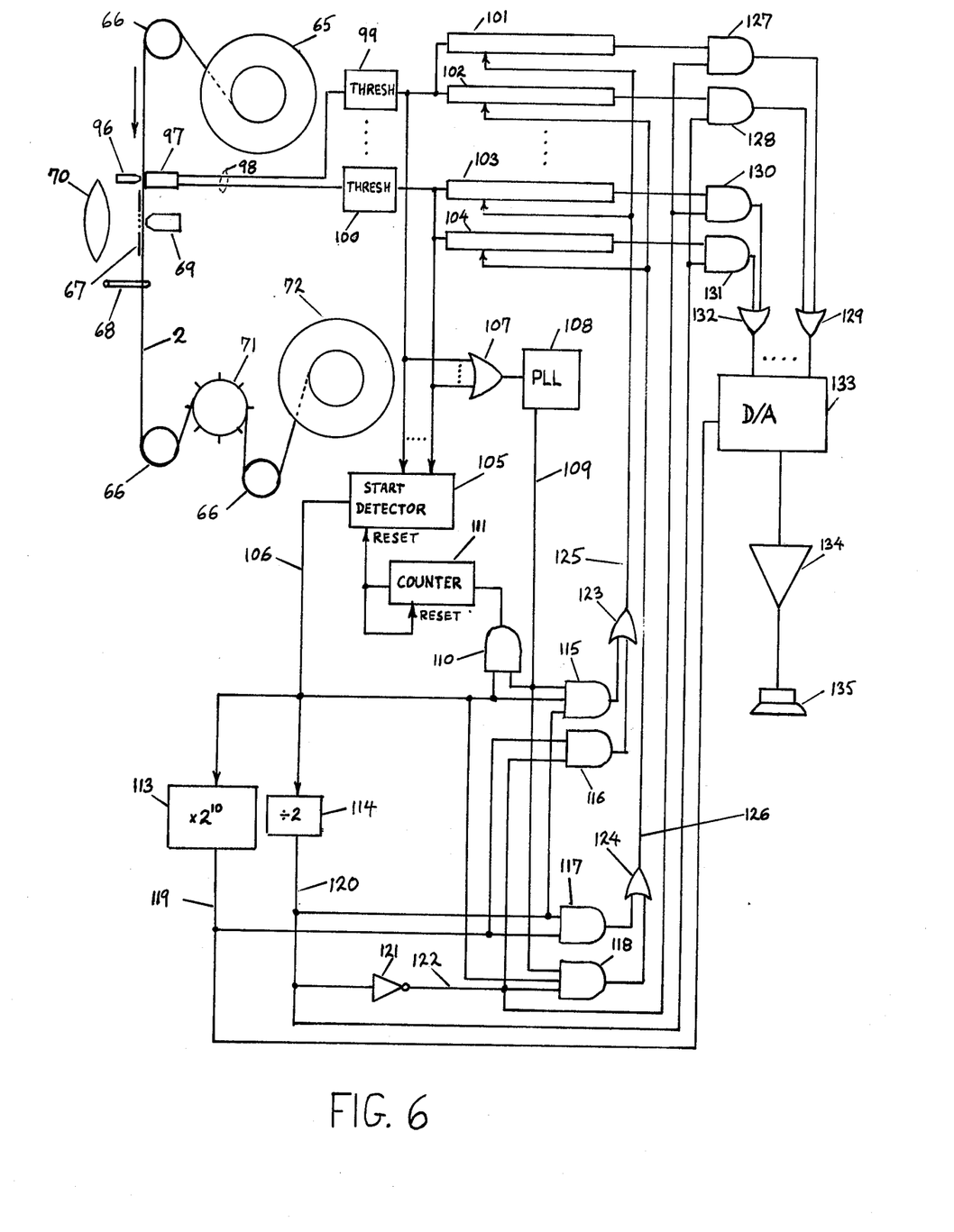
FIG. 6 is a combined electrical block diagram and schematic side elevational view of a projector constructed in accordance with and embodying the present invention.

An embodiment of the projector comprising the sound and vision reproducer of the system is schematically illustrated in FIG. 6. The film 2, containing optically recorded visual images and digital sound pulses is drawn from supply reel 65, around roller 66, and passed behind a projection gate 67. The film 2 is drawn by a claw 68 which is alternately inserted and removed from sprocket holes in the film 2. The shutter mechanism in the projection gate 67 is opened and closed once every frame interval, during that part of the frame interval when the claw 68 is not engaged in moving the film. Behind the film is a conventional projection lamp 69.

Figure 7:
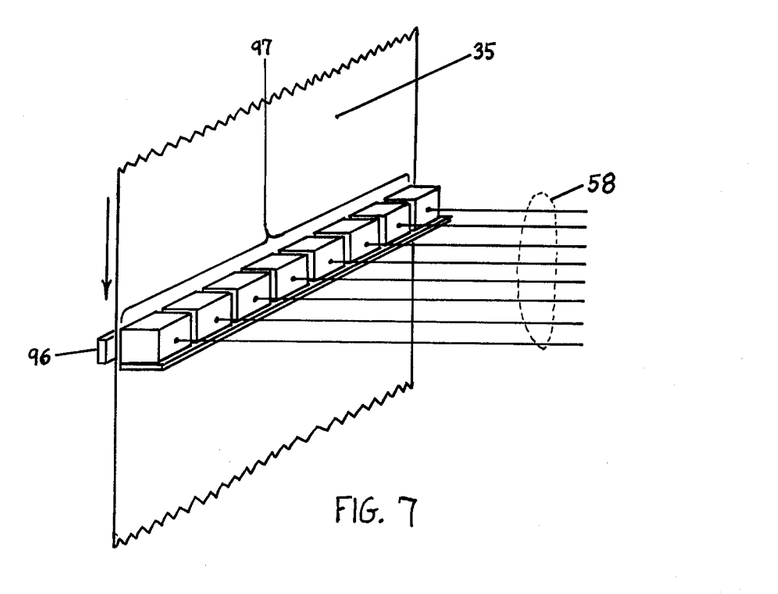
FIG. 7 is an enlarged side perspective view of the illumination element and photodetector array used in the projector of FIG. 6, and of a portion of the sound track of the film used in the camera of FIG. 1 and the projector of FIG. 6.

One frame length above the projection gate 67, and aligned across the sound track of the film, are a small sound track illumination source 96 on the lens side of the film, and a linear array 97 of small, discrete light-sensitive cells on the camera side of the film. As illustrated in FIG. 7, the array 56 lies across the sound track 35 of the film 2 in precisely the same manner as the LED array 6 of the camera (FIGS. 2 and 3) lies across the sound track 35 of the film 2 when it is in the camera. The array 97 of light-sensitive cells is in close proximity to the film, which is kept in place by a low friction film guide (not shown). The small sound track light source 96, one embodiment of which is a uniformly illuminated LED array, is located immediately opposite the photodetector array 97 on the other side of the film, and light shielding (not shown) is provided so that the photodetector array 97 can be excited only by passage of light from illumination source 96 through exposed portions of the sound track 35 of the film 2.

Returning to FIG. 6, during the fraction (taken to be ⅛ in this description) of each frame interval during which the film 2 is being advanced by claw 68, the N parallel rows of light dots appearing on the sound track and constituting the digital representation of the sound associated with the adjacent visual image in the same frame are detected by photodetector array 97. The electrical signals thus produced are sent through leads 98 to a bank of N threshhold detectors, two members of which are detectors 99 and 100, associated with the most significant and least significant digits respectively of the N-digit binary representation for each analog sound sample. Each threshold detector can be regarded as a decision device which outputs a "high" voltage when a light dot of sufficient size excites the associated photodetector in array 97 and a "low" voltage otherwise, thus disregarding small perturbations in the digital sound track, which can be regarded as "noise", and realizing a significant advantage of digital systems, that of signal regeneration.

The regenerated digital pulse train at the output of threshold detector 99, representing the most significant digit in each N-bit binary word, is applied to shift registers 101 and 102, and the regenerated digital pulse train at the output of threshold detector 100, representing the least significant digit in each binary word, is applied to shift registers 103 and 104. An additional (N-2) shift register pairs (not shown) receive data from their associated threshold detectors (not shown). The shift registers, performing an operation essentially inverse to that of the shift registers in the camera, receive data in bursts and clock it out continuously, as will subsequently be described.

Figure 8:
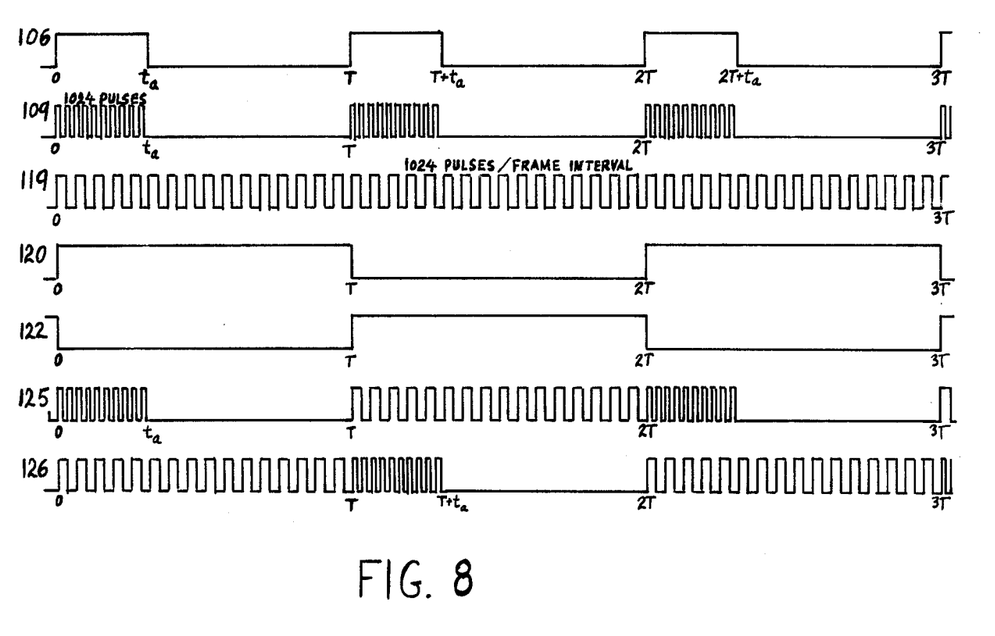
FIG. 8 is a representation of some of the electrical waveforms appearing in the projector of FIG. 6.

The outputs of the N threshold detectors, including detectors 99 and 100, are also applied to a start detector 105, constructed from shift-register stages and logical gates, which changes its output on lead 106 from "low" to "high" when three successive "high" outputs arrive from at least (N-1) of the N threshold detectors. It will be recalled from the description of the camera that a sequence of three "high" pulses is applied to each member of the LED array 6 (FIGS. 1, 2 and 3) immediately prior to application of the digitally-encoded sound data. A positive transition on lead 106 (FIG. 6) therefore indicates the beginning of a data burst. The signal on lead 106 remains "high" until 1024 data digits have been received from each of the threshold detectors, a condition detected by counter 111 and indicated by a pulse on lead 112, which resets the start detector and thus returns the signal on lead 106 to a "low" level. The signal on lead 106 is shown in FIG. 8.

Because the film advance velocity varies from one projector mechanism to another, the time $t_a$ (FIG. 8) during which waveform 106 is "high" cannot be precisely specified, but is immaterial because the present design will accomodate any film advance velocity met in normal practice. Start detector 105 is a digital sequence detector of conventional design and will not be further described.

The outputs of the N threshold detectors, including detectors 99 and 100, are further applied to an N-input OR gate 107 which outputs a "high" signal whenever any element of the photodetector array 97 is excited. Since there are N such elements, where N can be expected to be at least 6, there is a high probability that some element will be excited during each of the 1024 data intervals which together occupy a time interval $t_a$ (FIG. 8). The output of OR gate 107 is therefore almost a square wave during the interval $t_a$ (with 1024 cycles), and the phase-locked loop 108 to which it is applied smooths out the irregularities which remain and outputs a square wave on lead 109. This waveform, illustrated in FIG. 8, is the clocking waveform used for reading in data from the sound track of the film into the shift registers. The 1024 pulses it exhibits during the time interal $t_a$ is exactly the number of data pulses appearing in each frame on each of the N digital tracks of the film 2. In addition to its clocking function, the waveform on lead 109 is applied to counter 111 through AND gate 110, which conducts only when the output 106 of the start detector 105 is "high". Counter 111, as previously described, counts 1024 cycles of waveform 109 and then resets both the start detector and itself by means of a pulse output on lead 112.

Further describing the projector clocking and control circuit included in FIG. 6, the start detector output on lead 106, which is periodic with period equal to the frame interval T, is applied to a frequency multiplier 113, a frequency divider 114, and AND gates 115 and 118. Frequency multiplier 113, which can be realized by a phase-locked loop similar to that used in the camera clocking and control circuit of FIG. 4, produces a square wave on lead 119 with frequency 1024 times that of the waveform on lead 106. The waveform on lead 119 has, therefore, a frequency of 1024 per frame or 24576 per second for the nominal frame rate of 24 per second presumed in this description. The waveform on lead 119, illustrated in FIG. 8, is the clocking waveform used for reading out digital data from the storage registers 101, 102, 103, 104 and others not shown at a uniform rate close to that of the original sampling rate used in the camera of FIG. 1. Divider 114, to which the start detector signal on lead 106 is also applied, produces a waveform on lead 120 which is "high" on alternate frame intervals, as illustrated in FIG. 8. This waveform is inverted by inverter 121 to provide a waveform on lead 122 (also illustrated in FIG. 8) which is identical to that on lead 120 except that it is shifted by one frame interval T.

During the frame interval from 0 to T seconds, AND gate 115 can pass the reading clock waveform on lead 109 only during the interval from 0 to $t_a$ seconds when the inputs on lead 106 (from the start detector 105) and lead 120 are both "high". Otherwise the output of AND gate 115 is "low". AND gate 116 passes nothing during the entire frame interval from 0 to T because of the "low" input on lead 122. The output of OR gate 123 during this interval, appearing on lead 125, is then "low" except for the high-rate reading clock waveform during the interval from 0 to $t_a$ seconds, as illustrated in FIG. 8.

During this same frame interval from 0 to T seconds, AND gate 117 is able to pass the readout clocking waveform 119 because its other input, on lead 120, is "high". AND gate 118 is turned off by the "low" waveform on lead 122. Thus OR gate 124 passes, to its output on lead 126, the readout clocking waveform 119, as illustrated in FIG. 8.

During the subsequent frame interval from T to 2T seconds, the roles of gate combinations 115, 116, 123 and 117, 118, 124 are interchanged, due to the changes in waveforms 120 and 122, so that waveforms 125 and 126 also interchange, as illustrated in FIG. 8. It is apparent that waveform 125 alternates a read-clock frame with an output-clock frame, and that waveform 126 is identical except that it is displaced by one frame interval.

During the first $t_a$ seconds of the frame interval from 0 to T seconds, the first member of each pair of shift registers, e.g. register 101 or register 103, is clocked by waveform 125 at the rate appropriate for readin of the data sequence produced by its associated data detector, e.g. detector 99 or detector 100. Restricting attention to shift registers 101 and 102 and the subsequent gates 127, 128 and 129, it can be seen that while register 101 is being shifted by the readin clock on lead 125, its output is blocked by AND gate 127 because of the "low" waveform on lead 122. Register 101 is, therefore, in the data acquisition phase of its operation. Register 102, however, is at the same time, and in fact throughout the frame interval from 0 to T, being shifted by the readout clock on lead 126, and its output is gated through AND gate 128 by the "high" waveform on lead 120. The output of AND gate 128, at the uniform rate of 1024 per frame interval, is passed through OR gate 129 to digital to analog converter 133, which also receives data from OR gate 132 and the remaining (N-2) OR gates (not shown). Triggered by the square wave at the rate of 1024 per frame interval on lead 119, D/A converter 133 produces a stream of analog samples at this same rate which is passed through amplifier and low-pass filter 134, and then to a speaker or other analog sound reproducer 135. Simultaneously, the visual image corresponding to this portion of the sound waveform is advanced into the projection gate 67 and projected through lens 70 onto a screen (not shown).

During the next frame interval from T to 2T seconds, the functions of shift registers 101 and 102 (and similarly of the members of the other N-1 shift register pairs) are interchanged. A data sequence appears at the output of AND gate 128 instead of AND gate 127, but the operation of all subsequent circuit elements is the same as described above. The net result is a continuous analog sound waveform emanating from speaker 135 in perfect synchronism with the visual images projected through lens 70.

It should be understood that changes and modifications can be made from the above-described embodiments without departing from the nature and principle of this invention. It is therefore intended that the above description shall be read as illustrative and not in a limiting sense.

This completes the description of my invention. What I desire to claim and secure by letters patent is:

1. A system for producing motion pictures and digital photographic sound records concurrently and in synchronism, said system comprising:

a. film transport means for intermittently moving a photographic film,
b. means for recording a plurality of visual images on said photographic film,
c. means for producing a continuous analog sound waveform,
d. means for periodically sampling said waveform and producing a sequence of analog values, each proportional to the analog value of said waveform during respective samplings,
e. an analog to digital converter for converting said sequence of analog values into a sequence of digital values functionally related to said analog values,
f. means for storing and buffering said sequence of digital values,
g. means for optically imprinting digital indicia on said photographic film adjacent to said visual images, said indicia corresponding to said sequence of digital values,
h. means for gating said sequence of digital values connected between said means for storing and buffering and said means for optically imprinting,
i. means for controlling said means for storing and buffering and said means for gating such that said digital indicia are optically imprinted on said film, said digital indicia imprinted corresponding to the analog sound waveform produced during recording of the adjacent visual image.

2. The apparatus of claim 1 wherein said analog to digital converter is comprised of means for digitally encoding said analog values, the form of digital encoding being selected from the group consisting of pulse-code modulation, predictive encoding, delta modulation or differential pulse-code modulation.

3. The apparatus of claim 1 wherein each element of said sequence of digital values is in the form of a parallel binary word, said means for storing and buffering comprising a plurality of binary shift registers, said registers having sufficient word storage to accomodate twice the number of digital words generated by said analog to digital converter during the frame interval required for recording of one of said plurality of visual images.

4. The apparatus of claim 3 wherein said binary shift registers are grouped in pairs, each of said pairs storing an assigned digit of each of said digital words, and the two members of each of said pairs of binary shift registers alternating, from one of said frame intervals to the next, the functions of accepting said assigned digits at a uniform rate throughout said frame interval and outputting said assigned digits at a more rapid rate in a specified fraction of said frame interval.

5. The apparatus of claim 1 wherein said controlling means comprises a digital circuit which generates a desired binary starting sequence and appropriate digital clocking waveforms and provides them to said storing and buffering means and to said gating means such that said binary starting sequence and the sequence of said digital values produced during recording of a visual image are passed to said optical imprinting means during said intermittent movement of said film immediately following recording of said visual image.

6. The apparatus of claim 1 wherein said optical imprinting means is comprised of an array of light-emitting means, aligned transversally of the long dimension of said photographic film across the portion of said film normally reserved for a sound track and in close proximity to the emulsion of said film, and is situated at the exit of said visual image recording means.

7. The apparatus of claim 1 wherein said optical imprinting means is comprised of light-emitting means, said light-emitting means being adapted to scan across the portion of said film normally reserved for a sound track.

8. A system for reproducing, from a motion picture film with a sound track containing optically-imprinted digital indicia, visual and sound presentations concurrently and in synchronism, said system comprising:
a. film transport means for intermittently moving a photographic film,
b. means for projecting a plurality of visual images from said photographic film, each of said images defining a frame on said film,
c. means for detecting and converting to electrical representation of digital words said optically-imprinted digital indicia appearing in said sound track adjacent to said visual images in said frames,
d. means for detecting a binary starting sequence periodically imbedded in said sequence of digital words, and generating therefrom a synchronizing waveform,
e. means for storing and buffering said digital words,
f. means for converting the sequence of said digital words into a continuous electrical waveform essentially identical to that originally recorded, said means corresponding to the digital encoding means utilized in original recording of said digital indicia in said sound track,
g. means for gating said sequence of digital words connected between said means for storing and buffering and said means for converting the sequence of digital words,
h. means for controlling said means for storing and buffering, said means for gating and said means for detecting and converting such that said digital indicia on said film are optically detected during said intermittent movement of said film, and said digital words emerging from said storing and buffering means are made available in a continuous stream in synchronism with said visual images projected from said film,
i. means for amplifying and converting to sound said continuous electrical waveform.

9. The apparatus of claim 8 wherein said optical detection means comprises an array of photocells aligned transversally of the long dimension of said film across said sound track, in close proximity to said film, and situated one frame length preceding the entrance of said visual image projection means, and illumination source means situated on the opposite side of said film from said array.

10. The apparatus of claim 8 wherein said storing and buffering means comprises a plurality of binary shift registers, said registers having sufficient word storage to accomodate twice the number of digital words generated by said detection and conversion means during the frame interval required for the projection of one of said visual images.

11. The apparatus of claim 10 wherein said binary shift registers are grouped in pairs, each of said pairs storing an assigned digit of each of said digital words, and the two members of each of said pairs of binary shift registers alternating, from one of said frame intervals to the next, the functions of accepting said assigned digits at a rapid rate within a specified fraction of said frame interval and outputting said assigned digits at a uniform rate throughout said frame interval.

12. The apparatus of claim 8 wherein said controlling means comprises a digital circuit, driven by said synchronizing waveform generated by said starting sequence detection means and providing digital clocking waveforms to said storing and buffering means and said gating means such that said digital words emerging in a uniform stream from said storing and buffering means are in synchronism with said projected visual images.

* * * * *